(12) United States Patent  
Chosokabe

(10) Patent No.: US 7,955,173 B2
(45) Date of Patent: Jun. 7, 2011

(54) GAME DEVICE, GAME CONTROL METHOD AND PROGRAM

(75) Inventor: Akiyoshi Chosokabe, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1879 days.

(21) Appl. No.: 10/726,612

(22) Filed: Dec. 4, 2003

(65) Prior Publication Data

US 2004/0110559 A1    Jun. 10, 2004

(30) Foreign Application Priority Data

Dec. 6, 2002 (JP) .................................. 2002-355882

(51) Int. Cl.
*A63F 9/24* (2006.01)

(52) U.S. Cl. ............................................ 463/33; 463/30

(58) Field of Classification Search ................ 463/33
See application file for complete search history.

(56) References Cited

U.S. PATENT DOCUMENTS

| | | | |
|---|---|---|---|
| 5,616,079 A * | 4/1997 | Iwase et al. .................... | 463/32 |
| 5,877,769 A | 3/1999 | Shinohara et al. | |
| 6,049,337 A | 4/2000 | Van Overveld et al. | |
| 6,280,323 B1 * | 8/2001 | Yamazaki et al. ................ | 463/4 |
| 6,354,944 B1 * | 3/2002 | Takahashi et al. .............. | 463/32 |
| 6,468,157 B1 * | 10/2002 | Hinami et al. .................. | 463/32 |
| 2001/0030652 A1 * | 10/2001 | Kitao ............................ | 345/588 |
| 2001/0040575 A1 * | 11/2001 | Haga et al. .................... | 345/473 |

FOREIGN PATENT DOCUMENTS

| | | | |
|---|---|---|---|
| JP | 2002-183756 A | 6/2002 | |
| JP | 2002-298157 A | 10/2002 | |

OTHER PUBLICATIONS

European Search Report dated Dec. 16, 2005.
Charles Bloom; "Terrain Texture Compositing by Blending in the Frame-Buffer"; (available at URL:http://cbloom.com/3d/techdocs/splatting.txt) (last accessed <Nov. 17, 2005>); Nov. 2, 2000; XP002355134.
Dollner et al.; "Texturing Techniques for Terrain Visualization"; Proceedings Visualization 2000 Conference; Oct. 8, 2000-Oct. 13, 2000; pp. 227-234, XP002355135, Salt Lake City, UT.

(Continued)

*Primary Examiner* — Melba Bumgarner
*Assistant Examiner* — Tramar Harper
(74) *Attorney, Agent, or Firm* — Sughrue Mion, PLLC

(57) ABSTRACT

There is provided a game device that can improve reality of a game field, by causing change in an image for a game field due to various reasons, such as change in viewpoint, with a simple method. With a game device, in display processing executed by a control section (11), rendering control section (13), display storage section (14) and display section (1), a game control section (3) carries out processing of game content performed inside a game field based on player operations, a composition rate change section (33) changes an image composition rate, a display control section (34) generates a composite image combining a plurality of image data based on the image composition rate, and a game field is displayed using the composite image.

20 Claims, 4 Drawing Sheets

OTHER PUBLICATIONS

Debevec, et al.; "Efficient View-Dependent Image-Based Rendering with Projective Texture-Mapping"; Proceedings of Eurographics Workshop; (available at URL:http://www.debevec.org/Research/VDTM/debevec_vdtm_egrw98.pdf) (last accessed <Nov. 17, 2005>); Jun. 1998; pp. 105-117; XP002355136; Vienna; Austria.

Glenn Corpes; "Procedural Landscapes"; Game Developers Conference Europe; (available at URL:http://www.cix.co.uk/glennc/gdcetalk_files/frame.htm) (last accessed <Nov. 20, 2005>); Aug. 31, 2001-Sep. 1, 2001; XP002355137; London, UK.

* cited by examiner

GAME DEVICE, GAME CONTROL METHOD AND PROGRAM

BACKGROUND OF THE INVENTION

The present invention relates to a game device for controlling a game executed in a game field.

There are games such as a soccer game or a baseball game that are carried out in a game field such as a structure made up of a game scene and a pitch. With these types of game, in order to increase the presence imparted to a player, scene reality is regarded as important, and realistic representation is also required for the game scene.

For example, with a soccer game, there are the following approaches regarding grass inside the pitch, being the game field. Specifically, with an actual soccer pitch, since the grass is cut with a lawn mower, the grass is bent over in the direction of mowing to give a striped or latticed appearance to the grass. Generating a field image imitating this type of pattern is also carried out for a soccer game.

However, with a soccer game of the related art, the pattern of the grass does not change even if the viewpoint changes three-dimensionally. But if the viewpoint actually changes three-dimensionally, the viewing direction with respect to the mowing direction changes, which means that if the grass pattern is not changed in response to the change in direction, the reality is impaired.

Similarly, in display of a general game field also, there are cases where the pattern is to be changed based on change in viewpoint, but with the display methods generally carried out in the related art there are problems that the reality in these types of cases is impaired.

SUMMARY OF THE INVENTION

The present invention has been conceived in view of the above described problems, and an object of the present invention is to provide a game device, game control method and computer readable storage medium capable of improving reality of game fields by displaying a game field image based on various factors such as a change in a viewpoint, using a simple method.

The present invention for solving the above described problems is a game device for controlling a game executed inside a game field, comprising game processing means for carrying out processing game content executed inside the game field based on player operations, composition ratio changing means for changing one or more image composition ratios, and display means, for generating a composite image composed of a plurality of image data based on the image composition ratios and displaying a game field using the composite image.

In this way, it is possible to simply realize variation in a game field image based on various causes, and to improve reality.

Here, it is possible for the game field to be arranged in three-dimensional space, the display means to display the game field based on a set viewing direction, and the composition ratio changing means to change the image composition ratios based on at least one of the viewing direction and a set light source position.

It is also possible for the display means to carry out display of a game field by arranging models to which the plurality of image data set as textures in an overlapped manner in three-dimensional space and carrying out rendering.

The present invention for solving the above described problems is a game control method for controlling a game executed in a game field, using a computer, comprising the steps of processing game content executed in a game field based on player operations, using game processing means of the computer, changing one or more image composition ratios, using composition ratio change means of the computer, and generating a composite image that is a combination of a plurality of image data based on the image composition ratio and displaying a game field using the composite image, using image display means of the computer.

Also, the present invention for solving the above described problems of the related art is a computer-readable storage medium storing a program to execute control of a game carried out in a game field, in a computer, the program causing the computer to execute the steps of processing game content executed in the game field based on player operations, changing one or more image composition ratios, and generating a composite image that is a combination of a plurality of image data based on the image composition ratios and displaying a game field using the composite image.

DESCRIPTION OF THE PREFERRED EMBODIMENTS

Figure 1:
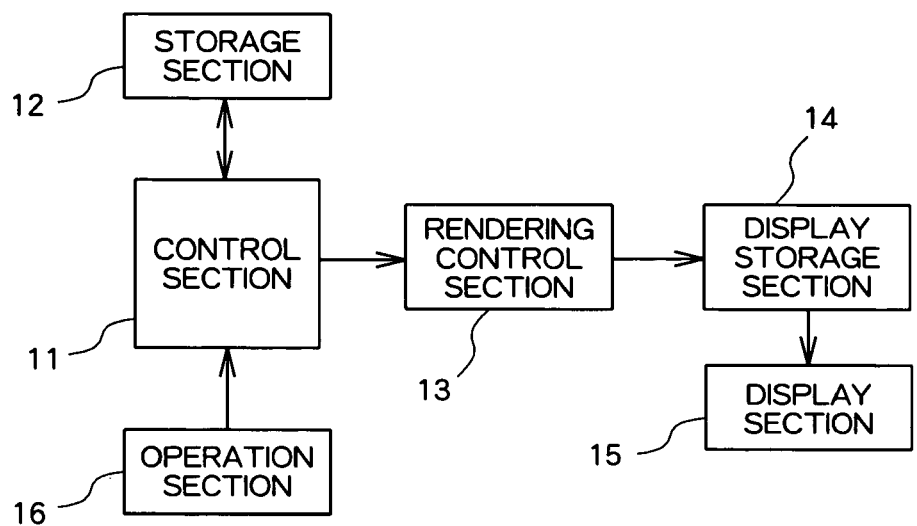
FIG. 1 is a structural block diagram of a game device of an embodiment of the present invention.

Embodiments of the present invention will now be described with reference to the drawings. A game device of an embodiment of the present invention comprises a control section 11, a storage section 12, a rendering control section 13, a display storage section 14, a display section 15 and an operation section 16, as shown in FIG. 1.

The control section 11 operates in accordance with a program held in the storage section 12, executes specified game processing in response to player operations input from the operation section 16, causes the results of that processing to be rendered in the rendering control section 13, and executes processing to display on the display section 15. The control section 11 also determines rendering content of a game image, such as game field, or character or obstacle on the game field, and outputs that determined content to the rendering control section 13 to carry out rendering of the game image. What is characteristic of this embodiment is that using display processing for the game field by the control section 11 and the rendering control section 13, the game field image is changed in accordance with change in the viewing direction and light source position. The content of this game field display processing will be described in detail later.

The storage section 12 stores a program executed by the control section 11. This storage section 12 can also include a device for reading a program from a storage medium such as CD-ROM and DVD-ROM, as well as semiconductor memory. This storage section 12 also acts as a work memory holding various data generated in processing of the control section 11.

Figure 2:
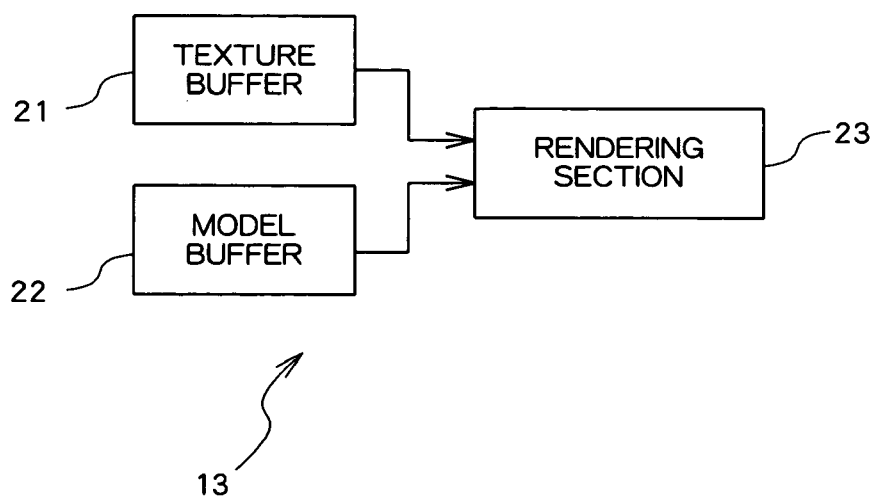
FIG. 2 is a structural block diagram showing one example of an image control section.

As shown in FIG. 2, the rendering control section 13 comprises a texture buffer 21, a model buffer 22, and a rendering section 23. The texture buffer 21 stores at least one image data as a texture in accordance with an instruction input from the control section 11. Also, the model buffer 22 receives input of model data (shape data representing setting etc, as to what type of figure is to be rendered based on vertex coordinate settings and each vertex coordinate, and appearance data representing what texture is to be set) from the control section 11 and stores at least one of the model data.

The rendering section 23 receives setting input for conditions such as viewpoint coordinates, viewing direction, light source position, light source type, and others, and based on the settings, sequentially renders each model stored in the model buffer 22 in the order of far away from the viewpoint first, when looking in the viewing direction from the set viewpoint coordinates, and sequentially stores each rendering result in the display storage section 14. Here, the rendering section 23 sets respective appearance data for each model, and also executes rendering while taking into consideration conditions such as set light source position, light source type etc. This rendering method can utilize general real time rendering technology, such as a Z-buffer algorithm, and so detailed description will be omitted.

The display storage section 14 is a so-called VRAM (Video Random Access Memory), and holds rendering results for at least one frame image input from the rendering control section 13. The display section 15 has a display controller etc., and outputs rendering results stored in the display storage section 14 to a display. Here, the display can be a television receiver etc., if the game device of this embodiment is a household game device. It can also be a CRT or projector if the game device is a commercial game device. The operation section 16 is a game controller, keyboard, mouse, etc., and receives player operations as input and outputs the content of those operations to the control section 11.

Here, content of display processing for the game field carried out by the control section 11, rendering control section 13, display storage section 14 and display section 15 will be described with reference to the functional block diagram of FIG. 3.

Figure 3:
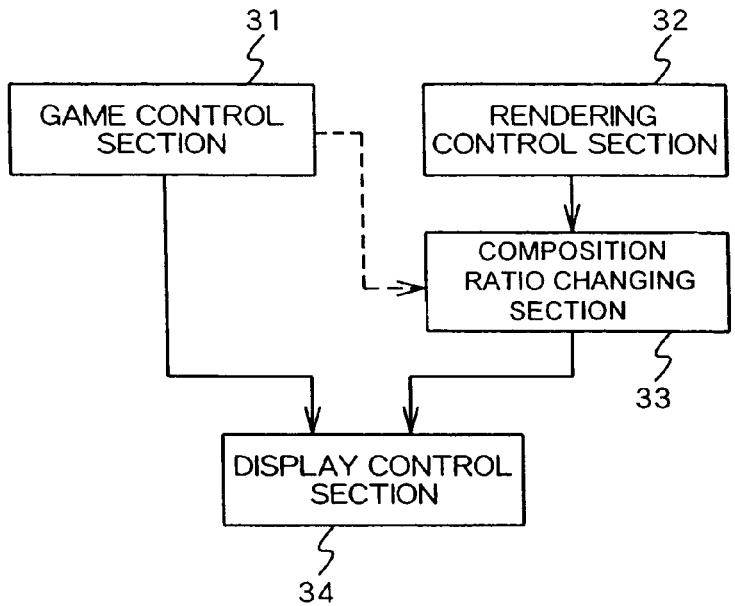
FIG. 3 is a functional block diagram showing one example of display processing for a game field.

As shown in FIG. 3, the functions realizing display processing of the game field include a game processing section 31, a presentation control section 32, a composition ratio change section 33, and a display control section 34, and can be implemented by hardware, software, or a combination of hardware and software.

The game processing section 31 processes game content played in the game field based on player operations, and according to the processing results, outputs commands to display characters controlled by a player on the game field to the display control section 34. Also, this game processing section 31 determines positions of characters other than the characters controlled by the player and displays them, and executes processing required in the game such as processing to determine position of a ball and cause the ball to be displayed, or determining whether or not a goal has been awarded etc. in the case of a soccer game.

The presentation control section 32 determines presentation conditions such as position for looking at the game field (viewpoint)), viewing direction, and light source position etc. based on conditions set in advance according to game progress controlled by the game processing section 31, for example, and outputs these conditions to the composition ratio change section 33 and the display control section 34. In detail, while causing the viewpoint to move along the periphery of the game field before starting a game (before starting a match if it is a soccer game), this presentation control section 32 makes the center of the game field a gazing portion (center circle in the case of a soccer game), sets the direction of this gazing portion as a viewing direction, and carries out representation so that a camera moves once around the game field. Also, during play, game field presentation is carried out so that the viewing direction faces a gazing portion (in the case of a soccer game, a character controlling a ball) on the game field, so that it appears as if from a fixed viewpoint (place where a camera is arranged). In these cases, the presentation control section 32, carries out presentation so as to view the game field from various directions, such as switching to other viewpoints and carrying out the same processing, in cases such as when there is a character or obstacle between the viewpoint and the gazing portion.

Figure 4:
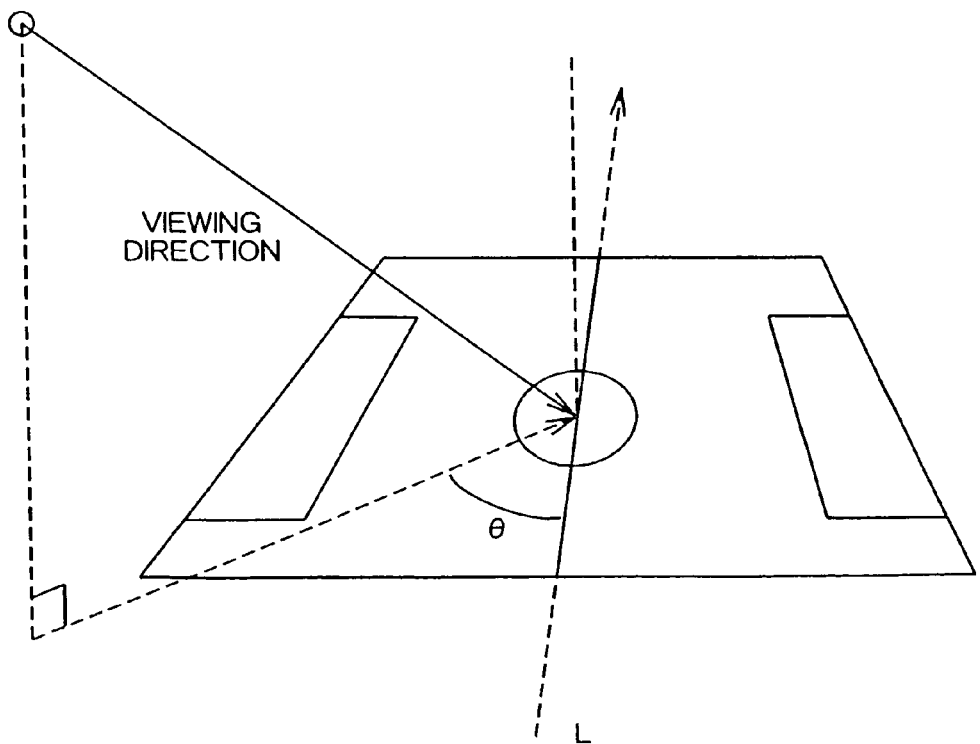
FIG. 4 is an explanatory drawing showing an angle formed by a viewing direction and a game field base line.

The composition ratio change section 33 refers information relating to presentation conditions, such as viewpoint, viewing direction, light source position etc. input from the presentation control section 32, and changes respective composition ratios (image composition ratios) for a plurality of image data used in display of the game field based on the referenced information. For example, as shown in FIG. 4, the composition ratio change section 33 calculates an angle θ (if the game field is planar, as shown in FIG. 4, this may be an angle formed by a vector obtained by projecting a vector of the viewing direction to that plane, and a vector of a base line L direction) formed by the viewing direction with respect to the base line L (if the game field is fixedly arranged on X, Y coordinates, this may be a line segment extending in the X axis or Y axis direction) set virtually on the game field, changes image composition ratio based on predetermined equations according to the angle θ, and outputs the image composition ratio after change to the display control section 34.

For example, when θ changes from 0 to 2π, these equations may define composition ratios σ1, σ2 respectively relating to two image data items as follows:

$$\sigma1=(68-24)\times\theta/\pi+24 \ (0\leq\theta<\pi)$$

$$\sigma1=(24-68)\times(\theta-\pi)/\pi+68 \ (\pi\leq\theta<2\pi)$$

$$\sigma2=(24-68)\times\theta/\pi+68 \ (0\leq\theta<\pi)$$

$$\sigma2=(68-24)\times(\theta-\pi)/\pi+24 \ (\pi\leq\theta<2\pi)$$

In this way, when θ=0, σ1 becomes 24, and σ2 becomes 68, while when θ=π, σ1 becomes 68, and σ2 becomes 24. Here, setting is such that σ1+σ2 becomes a fixed value of 100, but does not have to be a fixed value. In that case, a composite result image (composite image) will be slightly semitransparent (the background will show through). In FIG. 4, a game field of a soccer game has been used as one example, and so it does not matter if the game field is fixed within three-dimensional coordinates, but there are also cases where, depending on the game type, a game field constituted by a stage rotates. In this type of case, by adjusting according to an angle formed by the viewing direction and the virtual base line of the game field, the image composition ratio is gradually changed.

Also, an example using viewing direction is just one example. As well as this example, it is possible to change the image composition ratio depending on the light source position. For example, image composition ratio is changed based on how far and in what direction the light source is away from the virtual base position (in the case of a soccer game, the center of the center circle, etc.) of the game field. It is also possible to change the image composition ratio based on viewpoint position, and to change the image composition ratio based on other environmental conditions (game parameters generated or used by the game processing section 31, such as outbreak of fog, environmental temperature or score). Further, in a soccer game, it is possible for a player to select a type of stadium, constituting the game field, and to change image composition ratio calculation content for each stadium.

The display control section 34 can be implemented as processing in the rendering control section 13, display storage section 14 and display section 15, and generates a composite image that is composed of respective image data set as predetermined textures at respective composition ratios based on image composition ratios input from the composition ratio change section 33, to display this composite image on a display etc. as an image for the game field. Also, the display control section 34 composes and displays objects to be displayed on the game field, such as characters and obstacles, according to display instructions input from the game processing section 31, on the game field image.

Figure 5A:
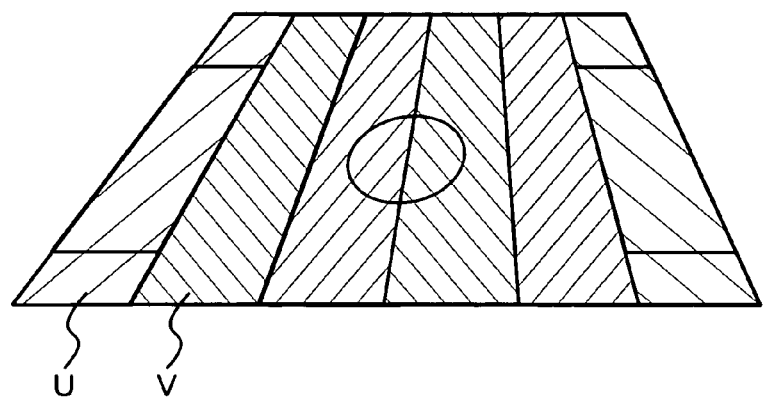
FIGS. 5A, 5B and 5C are explanatory drawings showing one example of display states for a game field.
Figure 5B:
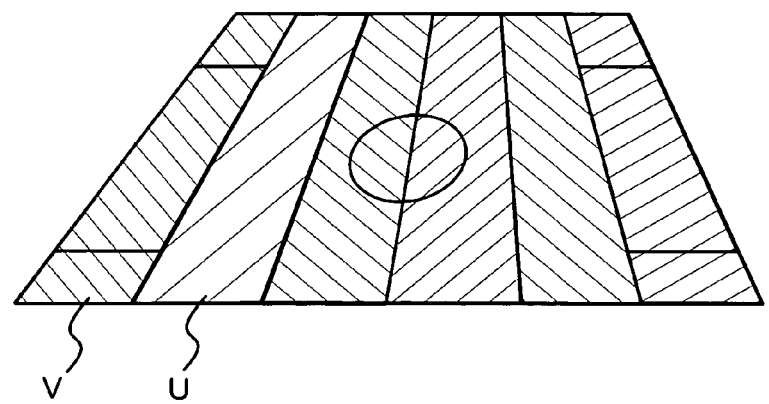
Figure 5C:
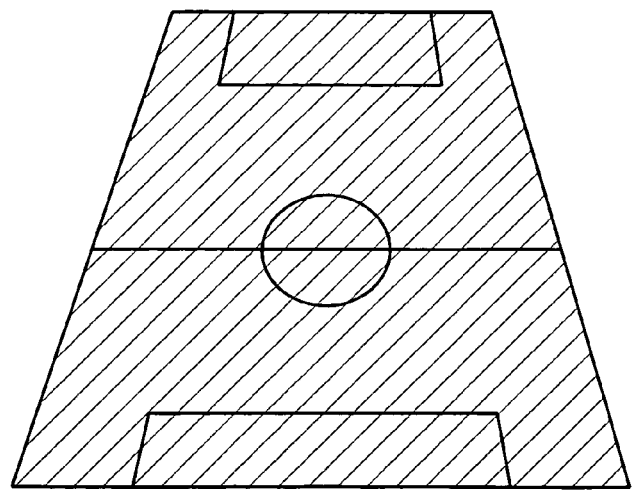

Operation of processing for the game field display of this embodiment will be described with the case of a game field for a soccer game having a generally striped appearance, as shown in FIG. 5A, as an example. In this type of case, it is possible to improve reality by carrying out game field display so that when looking from a main stand side (FIG. 5A) and when looking from a back stand side (FIG. 5B) color depth of respective regions U and V are reversed, and when looking from a side stand side, as shown in FIG. 5C, the color depth of each region is substantially the same. With each of FIG. 5A to FIG. 5C, difference in color depth is represented by difference in hatching style.

Figure 6:
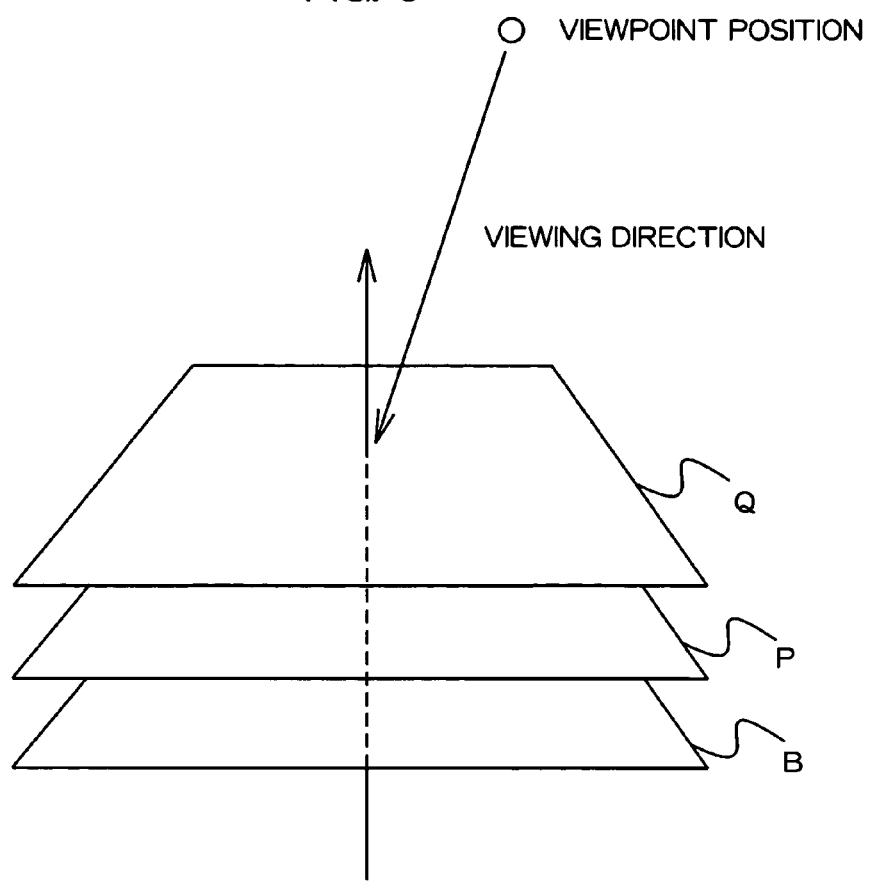
FIG. 6 is an explanatory drawing showing an arrangement example when using a model.

In the following example, the models as described below are set in the model buffer 22 of the rendering control section 13. Specifically, as shown in FIG. 6, a rectangular plane model (base model) B constituting a base is arranged, and a first plane model (first model) P, is also arranged so that the bottom surface thereof touches an upper surface or lower surface of the base model which is on the side of the viewpoint. A second plane model (second model) Q is arranged so that the bottom surface thereof touches the viewpoint side surface of the first model P. Here, the base model B, first plane model P and the second plane model Q all have the same shape. In FIG. 6, it has been made easy to discern space between each model, but in practice, they are arranged on top of one another very close together.

Figure 7A:
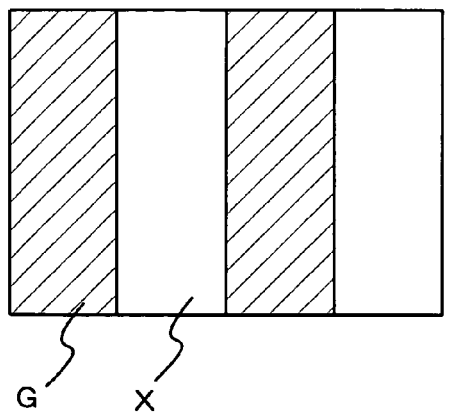
FIGS. 7A and 7B are an explanatory drawings showing examples of image data to be composed.
Figure 7B:
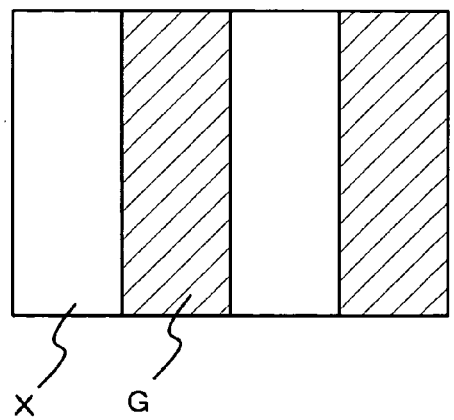

Also, image data representing the green of the grass (basic image data) is stored in the texture buffer 21 as a texture to be set for base model B. Further, image data (first pattern image data) rendering a dark green region G and a transparent region X in an interleaved manner so as to constitute a striped pattern parallel to, for example, a vertical edge of the rectangular first model P, as shown in FIG. 7A, is set in the texture buffer 21 as a texture to be set in the first model P, and image data (second pattern image data) rendering a dark green region G and a transparent region C parallel to a vertical edge so as to be opposite to the first pattern image data, as shown in FIG. 7B, is set in the texture buffer 21 as a texture to be set in the second model Q.

Under the above conditions, when the viewpoint and the viewing direction are changed by the presentation control section 32, the composition ratio change section 33 determines an image composition ratio for the first pattern image data and the second pattern image data, and outputs this to the display control section 34. The display control section 34 performs rendering for the display storage section 14 sequentially from furthest away from the viewpoint. That is, a texture for basic image data is first set in the base model and then rendered, by the rendering control section 13, and the results of rendering are stored in the display storage section 14. Then, the rendering control section 13 further sets image composition ratio relating to the first pattern image data that has been determined by the composition ratio change section 33 for the first pattern image data, and sets the first pattern image data to which the image composition ratio has been set as a texture for the first model P and performs rendering, and composites (blends) that rendering result with image data being stored in the display storage section 14 at that point in time. Specifically, at the point in time where the rendering result is being blended, a result of adding a pixel value P0 corresponding to a pixel having the image composition ratio set among the pixel values stored in the display storage section 14, to multiplication pixel value P1 having composition ratio set times image composition ratio $\sigma 1$, that is a value of $P0+P1\times\sigma 1$, is set as a new pixel value. The same processing is also carried out for the second pattern image data, an image composition ratio determined by the composition ratio change section 33 is set relating to the second pattern image data, the second pattern image data having the composition ratio set is set and rendered as a texture for the second model Q, and that result is blended with stored content of the display storage section 14 at that point in time.

In this way, the display control section 34 can generate composite (blended) image data of the first pattern image data and the second pattern image data blended according to a positional relationship between the first model and the second model, and image composition ratio setting, and display this composite image.

Here, image composition based on image composition ratio has been carried out when storing in the display storage section 14, but before setting a texture for a model it is also possible to multiply each pixel value of the texture by the image composition ratio and to set the texture after multiplication by the image composition ratio to the model. Also, when using another method instead of the Z-buffer algorithm, such as a ray-tracing algorithm or a radiocity algorithm, at the time of rendering, each pixel value may be calculated while referring to image composition ratio set to the texture for each model, and the calculated pixel values may be stored in the display storage section 14.

Also, here a first model and a second model are used, but it is also possible to multiply image composition ratios respectively corresponding to basic image data, first pattern image data and second pattern image data, and then respectively add pixel values corresponding to these image data, thereby generate image data for composite texture to be set for base model B as a texture and perform rendering. In such cases, the first model and second model are not always necessary.

Also, the embodiments of the present invention are not only for use with three-dimensional models. With two-dimensional image data also, based on information relating to rendering, such as virtual light source position information, viewing direction, viewpoint etc., it is possible to determine an image composition ratio for a plurality of two-dimensional image data, and combine and display a plurality of two-dimensional image data at the determined image composition ratio.

Next, a description will be given of the operation of the game device of this embodiment of the present invention, using a soccer game as an example.

Before starting a game, the control section 11 stores a base model B, a first model P and a second model Q, as shown in FIG. 6, in the model buffer 22 of the rendering control section 13. The control section 11 also stores basic image data as a texture to be set in the base model B, first pattern image data (FIG. 7A) as a texture to be set in the first model P, and second pattern image data (FIG. 7B) as a texture to be set in the second model Q, in the texture buffer 21.

If the game is started, the control section 11 executes game processing in response to player operations input from the operating section 16, and renders the results in the rendering control section 13. For example, for a character controlled by a player, movement of that character is controlled in response to player operations, and the image for that character resulting from that control is rendered in the rendering control section 13.

The control section 11 also changes viewpoint and viewing direction for the game field based on conditions set in advance such as state of game progress. The control section 11 then determines image composition ratio for the first pattern image data and the second pattern image data according to an angle formed by this viewing direction and the base line of the game field, and sends instructions to the rendering control section 13.

The rendering control section 13, upon receipt of this instruction input, respectively sets the basic image data, first pattern image data and second pattern image data stored in the texture buffer 21 in the base model B, first model P and second model Q, and also sets respectively corresponding image composition ratios for the first pattern image data and the second pattern image data, and carries out rendering. In this rendering processing, in response to change in image composition ratio of the first pattern image data and the second pattern image data, when the viewing direction faces from the main stand side to the back stand side, the rendering control section 13 displays the game field as shown in FIG. 5A, when the viewing direction is from one side stand to the other side stand, the rendering control section 13 displays the game field as shown in FIG. 5C, and while when the viewing direction is from the back stand side to the main stand side, the rendering control section 13 displays the game field as shown in FIG. 5B, thereby in accordance with shifting from a view from the main stand side to a view from the back stand side, it is possible to render a situation where the grass itself gradually reverses.

The rendering control section 13 then further composes objects such as characters and obstacles on the image data for the game field stored in the display storage section 14, in accordance with an instruction input from the control section 11. The display section 15 displays a rendering result stored in the display storage section 14 on the display.

In this way, with this embodiment it is possible to improve reality of a game field using simple processing to change the image composition ratio.

In the description so far, a soccer game has mainly been used to give an example of game content, but the present invention is not thus limited. For example, it is also possible to carry out the same processing for game fields for such as dungeon in role playing games or a fighting stage in a fighting game. With a game that does not use three-dimensional models also, it is possible to easily represent image changes for the game field in response to change in light source position etc., and it is possible to improve reality.

Further, although the image composition ratio has been set as fixed for an entire image data screen, by using, for example, transparency mapping as an example of composition ratio setting, it is possible to generate composite images having gradation.

What is claimed is:

1. A game device having a processor and a memory configured for controlling a game executed inside a game field representing a field of play of a video game, comprising:
   means for carrying out processing of game content executed inside the game field based on player operations;
   means for changing a value $\sigma 1$ that varies based on an angle $\theta$ between a viewing direction and a base line, said angle $\theta$ having a value between 0 and $2\pi$, said value $\sigma 1$ relating to an image composition; and
   means, for generating a composite image composed of a pixel value P0 representing a base model, which is added to a first pattern image data $P1 \times \sigma 1$ representing a first model, to generate and store a new pixel value $P0+P1 \times \sigma 1$, said new stored pixel value $P0+P1 \times \sigma 1$ being added to a second pattern image data to generate and display the composite image on the surface of a substantially planar game field.

2. The game device of claim 1, wherein
   the game field is arranged in three-dimensional space,
   the means for generating displays the game field based on a set viewing direction, and
   the means for changing changes the value $\sigma 1$ based on at least one of the viewing direction and a set light source position.

3. The game device of claim 1, wherein the means for generating carries out display of the game field by arranging models to which said plurality of image data set as textures in an overlapped manner in three-dimensional space and carrying out rendering.

4. The game device of claim 1, wherein the second pattern image data comprises $P2 \times \sigma 2$ representing a first model, which is added to new stored pixel value $P0+P1 \times \sigma 1$.

5. The game device of claim 4, wherein the composite image comprises $P0+P1 \times \sigma 1+P2 \times \sigma 2$.

6. A game control method for controlling a game executed in a game field representing a field of play of a video game, using a computer, comprising the steps of:
   processing game content executed in a game field based on player operations, using game processing means of the computer;
   changing a value $\sigma 1$ that varies based on an angle $\theta$ between a viewing direction and a base line, said angle $\theta$ having a value between 0 and $2\pi$, said value $\sigma 1$ relating to an image composition; and
   generating a composite image that is a combination of a pixel value P0 representing a base model, which is added to a first pattern image data $P1 \times \sigma 1$ representing a first model, to generate and store a new pixel value $P0+P1 \times \sigma 1$, said new stored pixel value $P0+P1 \times \sigma 1$ being added to a second pattern image data to generate and display the composite image on a surface of a substantially planar game field, using image display means of the computer.

7. The game control method of claim 6, wherein the second pattern image data comprises $P2 \times \sigma 2$ representing a first model, which is added to new stored pixel value $P0+P1 \times \sigma 1$.

8. The game control method of claim 7, wherein the composite image comprises $P0+P1 \times \sigma 1+P2 \times \sigma 2$.

9. A non-transitory computer readable storage medium storing a program to execute control of a game carried out in a game field representing a field of play of a video game, in a computer, the program causing the computer to execute the steps of:

processing game content executed in the game field based on player operations;

changing a value $\sigma 1$ that varies based on an angle $\theta$ between a viewing direction and a base line, said angle $\theta$ having a value between 0 and $2\pi$, said value $\sigma 1$ relating to an image composition; and generating a composite image that is a combination of a pixel value P0 representing a base model, which is added to a first pattern image data P1×$\sigma 1$ representing a first model, to generate and store a new pixel value P0+P1×$\sigma 1$, said new stored pixel value P0+P1×$\sigma 1$ being added to a second pattern image data to generate and display the composite image on a surface of a substantially planar game field.

10. The computer readable storage medium of claim 9, wherein the second pattern image data comprises P2×$\sigma 2$ representing a first model, which is added to new stored pixel value P0+P1×$\sigma 1$.

11. A non-transitory computer readable storage medium storing a program to texture a surface with respect to a game carried out in a game field representing a field of play of a video game in a computer, the program causing the computer to execute the method comprising:

processing game content executed in the game field based on player operations;

calculating, for each texture of a plurality of textures, a value $\sigma 1$ that varies based on information relating to a view of said surface, said information including an angle $\theta$ between a viewing direction and a base line, said angle $\theta$ having a value between 0 and $2\pi$, said value $\sigma 1$ relating to an image composition;

combining said plurality of textures by combination of pixel value P0 representing a base model, which is added to a first pattern image data P1×$\sigma 1$ representing a first model, to generate and store a new pixel value P0+P1×$\sigma 1$, said new stored pixel value P0+P1×$\sigma 1$ being added to a second pattern image data to create a surface texture and to generate and display the combined plurality of textures on a surface of a substantially planar game field; and storing said surface texture.

12. The medium of claim 11, wherein said information relating to a view of said surface comprises said angle $\theta$ indicating the rotation of said surface, in the plane of said surface, relative to a viewpoint position.

13. The medium of claim 12, wherein each of said plurality of textures is associated with one of a plurality of auxiliary surfaces immediately above said surface, said auxiliary surfaces having a shape identical to said surface.

14. The medium of claim 12, wherein said combining said plurality of textures comprises, multiplying said textures by a value, and adding together the resulting textures.

15. The medium of claim 12, further comprising causing said surface texture to be displayed as a texture of said surface.

16. The medium of claim 12, wherein said surface texture is a representation of a sports field surface.

17. The medium of claim 16, wherein said plurality of textures comprises a first texture comprising transparent areas and colored areas, and a second texture comprising colored areas in positions corresponding to the transparent areas of the first texture, wherein the colored areas of the first and second textures are differently shaded.

18. The medium of claim 11, wherein said information relating to a view of said surface comprises said viewing direction.

19. The medium of claim 11, wherein said information relating to a view of said surface comprises positions of one or more light sources.

20. The computer readable storage medium of claim 11, wherein the second pattern image data comprises P2×$\sigma 2$ representing a first model, which is added to new stored pixel value P0+P1×$\sigma 1$.

* * * * *